(12) United States Patent
Szeteli et al.

(10) Patent No.: US 12,545,568 B2
(45) Date of Patent: Feb. 10, 2026

(54) DISPENSING SYSTEM AND METHOD OF OPERATING A DISPENSING SYSTEM

(71) Applicant: AS Strömungstechnik GmbH, Ostfildern (DE)

(72) Inventors: Andreas Szeteli, Filderstadt (DE); Timo Steissliger, Reutlingen (DE)

(73) Assignee: AS Stroemungstechnik GmbH, Ostfildern (DE)

( * ) Notice: Subject to any disclaimer, the term of this patent is extended or adjusted under 35 U.S.C. 154(b) by 34 days.

(21) Appl. No.: 18/533,227

(22) Filed: Dec. 8, 2023

(65) Prior Publication Data
US 2024/0190595 A1  Jun. 13, 2024

(30) Foreign Application Priority Data
Dec. 8, 2022  (DE) .......................... 102022132620.9

(51) Int. Cl.
| | | |
|---|---|---|
| *B67C 3/34* | (2006.01) | |
| *B25J 13/08* | (2006.01) | |
| *B65B 3/04* | (2006.01) | |
| *B65B 69/00* | (2006.01) | |
| *B67C 9/00* | (2006.01) | |
| *B67D 7/02* | (2010.01) | |
| *G05D 15/00* | (2006.01) | |

(52) U.S. Cl.
CPC ............... *B67C 3/34* (2013.01); *B25J 13/085* (2013.01); *B65B 3/04* (2013.01); *B65B 69/00* (2013.01); *B67C 9/00* (2013.01); *B67D 7/0288* (2013.01); *G05D 15/00* (2013.01)

(58) Field of Classification Search
CPC .... B67C 3/30; B67C 3/34; B67C 9/00; B65B 3/04; B65B 69/00; B67D 7/0288; B25J 13/00; B25J 13/08; B25J 13/085; G05D 15/00
See application file for complete search history.

(56) References Cited

U.S. PATENT DOCUMENTS

| | | | |
|---|---|---|---|
| 8,256,480 B1 * | 9/2012 | Weber ................. | B29C 65/7838 156/359 |
| 11,565,422 B2 * | 1/2023 | Ooba ........................ | B25J 13/08 |
| 11,655,136 B2 * | 5/2023 | Szeteli ................. | B67D 7/0294 141/351 |

(Continued)

FOREIGN PATENT DOCUMENTS

| | | | | |
|---|---|---|---|---|
| DE | 102007050232 B4 * | 5/2024 | ............ | B25J 13/085 |
| WO | WO-2018060925 A1 * | 4/2018 | .......... | B25J 11/0075 |

*Primary Examiner* — Nicolas A Arnett
(74) *Attorney, Agent, or Firm* — Von Rohrscheidt Patents

(57) ABSTRACT

A method for operating a dispensing system (1) with at least one container (2) having a container opening (6), and a dispense head (4) mounted on a robot arm (11) of a robot (10). The dispense head (4) is automatically connected to the container opening (6) of the container by means of the robot (10), such that liquid (3) can be removed from the container (2) or liquid (3) can be supplied to the container (2). When the dispense head (4) is inserted into the container opening (6), forces acting on the dispense head (4) are detected by means of an arrangement of force sensors (14). The robot arm (11) carries out compensation movements dependent upon the detected forces, whereby the dispense head (4) is aligned to the container opening (6).

15 Claims, 7 Drawing Sheets

(56) References Cited

U.S. PATENT DOCUMENTS

| | | | |
|---|---|---|---|
| 11,738,982 B2* | 8/2023 | Imai | F16J 13/24 |
| | | | 439/271 |
| 11,975,958 B2* | 5/2024 | Tsai | B67D 7/0288 |
| 2003/0164200 A1* | 9/2003 | Czeranna | B62D 65/18 |
| | | | 141/1 |
| 2019/0299350 A1* | 10/2019 | Sakai | B25J 9/1682 |
| 2021/0283771 A1* | 9/2021 | Ijiri | B25J 9/1664 |
| 2022/0380190 A1* | 12/2022 | Imai | B67D 7/0288 |
| 2023/0030810 A1* | 2/2023 | Imai | B25J 9/1664 |
| 2023/0373103 A1* | 11/2023 | Littfin | B25J 19/023 |

\* cited by examiner

DISPENSING SYSTEM AND METHOD OF OPERATING A DISPENSING SYSTEM

CROSS REFERENCE TO RELATED APPLICATIONS

This application claims the priority of DE 102022132620.9 filed on 2022 Dec. 8; this application is incorporated by reference herein in its entirety.

BACKGROUND

The invention relates to a dispensing system and a method for operating a dispensing system.

Such a dispensing system is used for filling and draining containers, particularly barrels, filled with liquid chemicals. The dispensing system comprises a dispense head, which can be fastened to a dip tube of a container. By means of the dispense head, via the dip tube, liquid can be removed from the container or supplied to the container.

Once a filling or dispensing procedure is completed, the dispense head is detached from the dip tube and this is closed with a dip tube closure, such that the container can then be transported without liquid escaping from the container.

In known dispensing systems, the dispense head is typically attached and released manually by a user. It is disadvantageous in this regard that a considerable personnel outlay is required, particularly when large facilities are involved, at which a large number of containers to which dispense heads must be connected is present. Additionally, there is the risk that the user or users may come into contact with possibly hazardous chemicals.

Furthermore, it is possible for dispense heads to be attached to containers in an automated manner by means of robots.

The dispense head is then mounted on a robot arm. By movements of the robot arm, the dispense head is guided to a container opening of the container, at which the dip tube opens out. The dispense head must be positioned and connected there.

Typically, the respective container is stored on a horizontal substrate, in the ideal case the dip tube runs exactly perpendicular to the cover of the container in which the container opening is present, i.e., in the vertical direction. The dispense head is then guided to the container opening in a vertical movement and is then connected to the dip tube.

In this context, due to manufacturing tolerances, it is problematic that the container opening and the edge delimiting the container opening do not run exactly perpendicular, but rather somewhat inclined thereto. If the dispense head is then guided onto the container opening in a vertical approach direction, the dispense head jams there, which significantly impedes, or even makes impossible, the insertion of the dispense head.

SUMMARY

The invention relates to a method for operating a dispensing system (1) with at least one container (2) having a container opening (6), and a dispense head (4) mounted on a robot arm (11) of a robot (10). The dispense head (4) is automatically connected to the container opening (6) of the container by means of the robot (10), such that liquid (3) can be removed from the container (2) or liquid (3) can be supplied to the container (2). When the dispense head (4) is inserted into the container opening (6), forces acting on the dispense head (4) are detected by means of an arrangement of force sensors (14). The robot arm (11) carries out compensation movements dependent upon the detected forces, whereby the dispense head (4) is aligned to the container opening (6).

DETAILED DESCRIPTION

The invention seeks to solve the problem of providing a dispensing system and a method that enables a reproducible, automated connection of a dispense head to a container opening of a container.

The features of the independent claims are provided to solve this problem. Advantageous embodiments and appropriate further developments of the invention are described in the dependent claims.

The invention relates to a method for operating a dispensing system with at least one container having a container opening and a dispense head mounted on a robot arm of a robot. The dispense head is automatically connected to the container opening of the container by means of the robot, such that fluid can be removed from the container or fluid can be supplied to the container. When the dispense head is inserted into the container opening, forces acting on the dispense head are detected by means of an arrangement of force sensors. The robot arm carries out compensation movements dependent upon the detected forces, by which the dispense head is aligned to the container opening.

The invention also relates to a corresponding dispensing system.

An arrangement of force sensors is provided according to the invention, by means of which forces acting on the dispense head are detected when it is guided towards the container opening of the container to connect the dispense head there. The force measurements carried out with the arrangement of force sensors provide a measure for a misalignment of the dispense head relative to the container opening, and therefore also to a dip tube opening out at the container opening, into which dip tube the dispense head must be inserted.

According to the invention, the robot arm carries out compensation movements dependent upon the detected forces. The acting forces are avoided with the compensation movements, by which it is achieved that the dispense head is aligned relative to the container opening and the dip tube such that the dispense head is inserted into the container opening and the dip tube as free of forces as possible, i.e. the dispense head is aligned to the container opening and the dip tube in an optimized manner, whereby a reliable and reproducible connection of the dispense head to the container opening and dip tube is enabled.

It is especially advantageous for acting forces to be minimized by the compensation movements.

For this purpose, it is appropriate for acting forces to be compared to target values.

An optimized avoidance of forces acting on the dispense head is thereby achieved with the compensation movements.

In the simplest case, the arrangement of force sensors comprises only one force sensor, such that forces acting on the dispense head can only be measured from one position. In this case, compensation movements are performed according to the trial and error principle, i.e. a sequence of compensation movements is carried out and the force measured with the force sensor is continuously evaluated. The compensation movement for which the lowest force is measured, is then selected and continued.

According to an especially advantageous embodiment of the invention, a position-resolved detection of forces is carried out with the arrangement of force sensors.

In particular, an angle-resolved detection of forces takes place in the circumferential direction of the dispense head.

In this case, the arrangement of force sensors comprises multiple force sensors. The sensor signals of the force sensors then supply information about the direction of the acting forces. Dependent thereupon, the direction of the compensation movements can be immediately prescribed to optimally avoid the acting forces.

According to an advantageous embodiment, the arrangement of force sensors is arranged in the robot arm.

Since the dispense head is rigidly coupled to the robot arm, forces acting on the dispense head are transmitted directly to the robot arm and can be detected there by the force sensors in particular in a position-resolved manner.

Advantageously, the robot has a control unit to which sensor signals of the force sensor(s) are fed.

Furthermore, the compensation movements of the robot arms are controlled with the control unit.

The control unit of the robot thus controls and optimizes the alignment of the dispense head to the container opening and the dip tube.

To carry out the alignment of the dispense head to the container opening and the dip tube, axes of the robot arm are released by the control unit, so that the robot arm can carry out the compensation movements.

Especially advantageously, the axes of the robot arm are released only during an insertion move in which the dispense head is guided towards the container opening.

Uncontrolled movements of the dispense head are thereby prevented when it is yet distanced farther from the container opening. Such uncontrolled movements of the dispense head can arise due to a line, e.g., a hose, being fastened to the dispense head, which hose can be connected to a pump for dispensing liquid out of the container.

It is especially advantageous for different compensation movements to be carried out dependent upon the relative position between dispense head and container opening.

The alignment action of the dispense head thus occurs in multistage fashion dependent upon the relative position of the dispense head to the container opening or to the dip tube, respectively, whereby an especially exact alignment of the dispense head is possible.

In particular when the dispense head is guided towards an edge delimiting the container opening, a compensation movement is carried out transverse to the longitudinal axis of the dispense head dependent upon the forces then detected.

If the container opening or the edge of the container opening delimiting the container opening, respectively, is not formed exactly straight due to manufacturing tolerances, upon a first contact of the dispense head with the edge of the container opening, a correspondingly asymmetrical distribution of the acting forces results. These forces are avoided in an optimized manner with the compensation movements transverse to the longitudinal axis of the dispense head, particularly those running in the horizontal direction.

When the dispense head approaches further, it is inserted into the dip tube.

Advantageously for this purpose, the dispense head has a cylindrical connection segment that can be inserted into a dip tube of the container.

The outer diameter of the cylindrical connection element is adapted to the inner diameter of the dip tube, which results in a good adaptation of the dispense head to the dip tube.

Advantageously, in a second step of the alignment action of the dispense head, when the dispense head is inserted into the dip tube, a tilting movement of the dispense head is carried out dependent upon the forces detected.

The position of the dispense head is thus adapted to a possibly inclined position of the dip tube and the dispense head is inserted into the dip tube without risk of jamming and the dispense head can then be connected to the dip tube.

BRIEF DESCRIPTION OF THE DRAWINGS

The invention is explained in the following with reference to the drawings. They show.

DETAILED DESCRIPTION OF THE PREFERRED EMBODIMENTS

Figure 1:
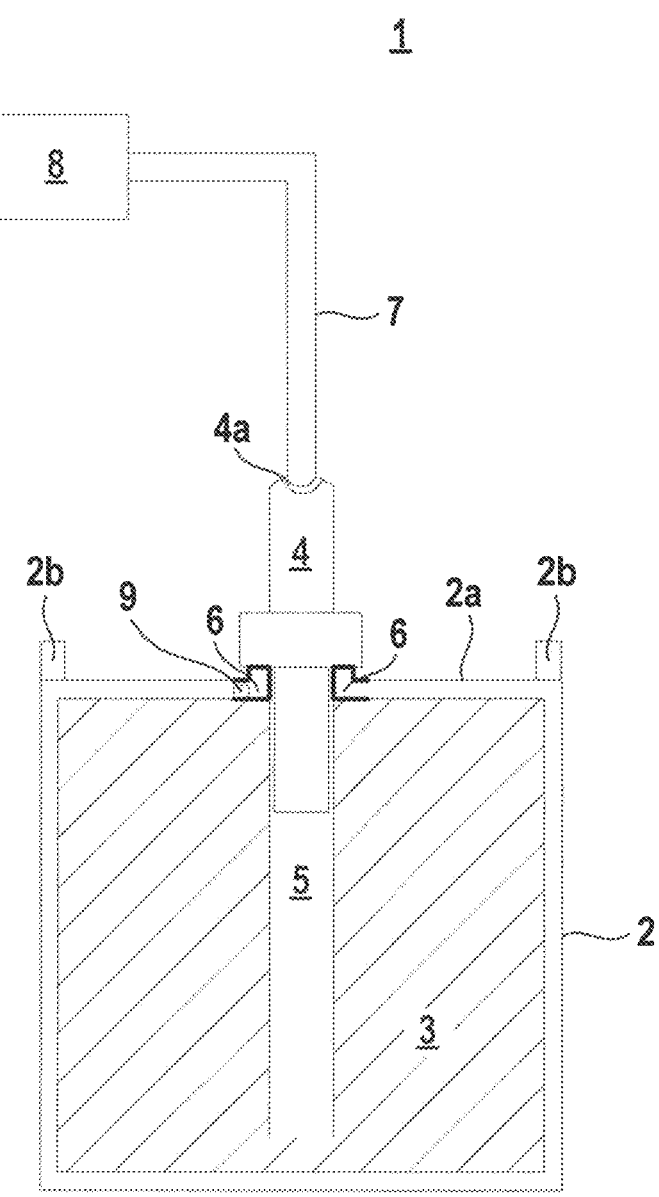
FIG. 1: Schematic depiction of the dispensing system according to the invention.

FIG. 1 shows schematically an exemplary embodiment of the dispensing system 1 according to the invention for transportable containers 2, which can be formed in particular by barrels or the like. A liquid 3 is stored in the respective container 2. The liquids 3 stored in such containers 2 are, in particular, special chemicals in liquid form.

The dispensing system 1 comprises a dispense head 4, which can be fastened to a dip tube 5. FIG. 1 shows the dispense head 4 fastened to the dip tube 5. The dip tube 5 is placed in a container opening 6 of the container 2. The longitudinal axis of the dip tube 5 ideally runs in the vertical direction when the container 2 is set down on a horizontal substrate.

The dispense head 4 is used for removing liquid 3 from the container 2. The dispense head 4 can also be used for filling containers 2. For this purpose, the dispense head 4 has a liquid connection 4a at its upper end. A line, which in the present case is formed by a hose 7 which leads to a pump 8, is connected to this liquid connection 4a. The pump 8 is controlled by a control unit (not shown).

On its lower end facing toward the container 2, the dispense head 4 has a cylindrical connection segment 4b that projects into the dip tube 5. The outer diameter of the cylindrical connection segment is adapted to the inner diameter of the dip tube 5.

As is evident from FIG. 1, the container 2 has on the top a cover 2a extending in a plane, from which cover 2a an edge 2b projects upwards.

The container opening 6 with the dip tube 5 inserted there is located in the cover 2a. In the region where the dip tube 5 opens out, there is an RFID chip 9 in which at least one code is stored. Data that uniquely identify the container 2 and/or the liquid 3 stored there are encoded in the code.

Figure 2:
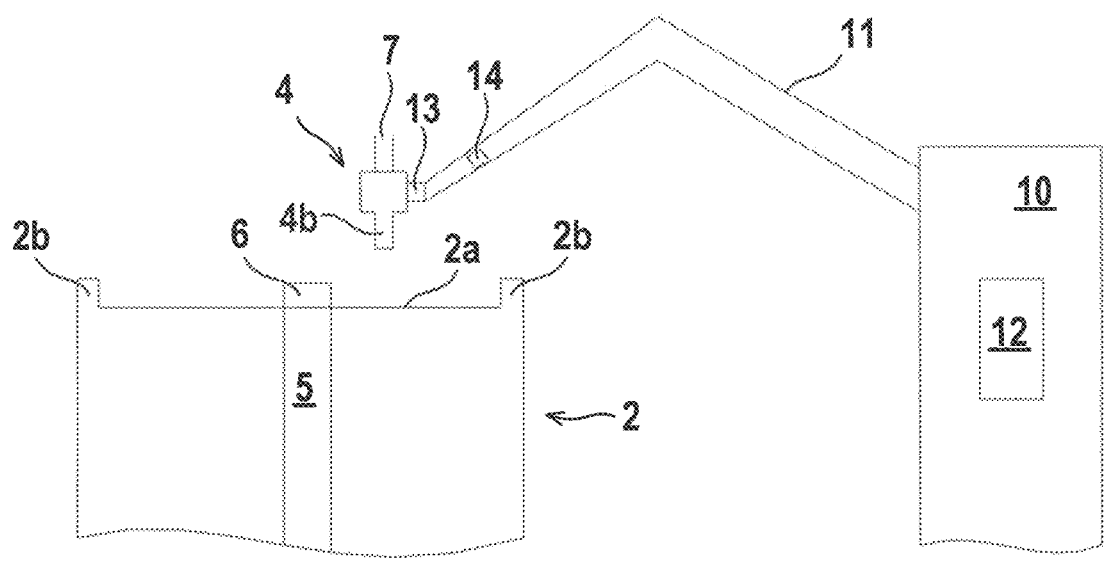
FIG. 2: Schematic depiction of a robot for connecting a dispense head to a container opening of a container of the dispensing system according to FIG. 1.

The dispensing system 1 is operated in automated fashion by means of a robot 10 (FIG. 2). The robot 10 has, in a known manner, a retractable and extendable robot arm 11 that is movable in three dimensions that can perform work movements. The robot arm 11 is controlled by a control unit 12. The current position of the robot arm 11 in the workspace is detected continuously by means of a sensor apparatus integrated in the robot 10.

The robot arm 11 has a connection flange 13 onto which different components of the dispensing system 1 can be fastened and connected automatically.

A measurement head (not shown) can be connected, in particular, to the connection flange 13 of the robot arm 11. A coil that forms the sensor element of an RFID reader unit is integrated in the measurement head. The electronic components of the RFID reader unit are integrated in the robot 10. The code can be read out from the RFID chip 9 with the measurement head, whereby the container 2 can be uniquely identified.

FIG. 2 shows the situation when the dispense head 4 is fastened to the connection flange 13 of the robot arm 11. The dispense head 4 can be automatically connected to the container opening 6 and the dip tube 5 (as shown in FIG. 1) by approach movements of the robot arm 11.

An arrangement of force sensors 14 is present in the robot arm 11. In the present case, the arrangement comprises multiple force sensors 14. Since the dispense head 4 is rigidly coupled to the robot arm 11 at the connection flange 13, forces acting on the dispense head 4 are measured with the force sensors 14. A position-resolved force measurement, in particular an angle-resolved force measurement, occurs such that forces acting in the circumferential direction of the dispense head 4 can be detected in a position-resolved manner.

The alignment of the dispense head 4 relative to the container opening 6 and to the dip tube 5 according to the method according to the invention is described in FIGS. 3 to 7.

FIGS. 3 to 7 show the upper region of the container 2, the cover 2a of which runs exactly in the horizontal direction. Due to manufacturing tolerances, the container opening 6 of the container 2 does not run straight, i.e. not in a horizontal plane, but rather slightly inclined thereto. Correspondingly, the longitudinal axis of the dip tube 5 does not run exactly in the vertical direction, but rather slightly inclined thereto.

Despite these mispositionings caused by manufacturing tolerances, with the method according to the invention the dispense head 4 can be securely fastened with the robot 10 in or on the dip tube 5 automatically without jamming.

To do so, the control unit 12 evaluates the sensor signals generated by the force sensors 14 and in dependence thereupon generates compensation movements, whereby the dispense head 4 is aligned to the container opening 6 and the dip tube 5. The compensation movements generally occur such that the forces acting on the dispense head 4 become minimal. To do so, the position-resolved force values generated by the force sensors 14 are compared to target values in the control unit 12. The compensation movements are then carried out such that the measured force values lie below the target values.

Individual or all axes of the robot arm 11 are released by the control unit 12 for carrying out the compensation movements. To prevent uncontrolled movements of the dispense head 4 caused thereby, the release of the axes occurs in the control unit 12 and as a result compensation movements are released only during an insertion move.

Figure 3:
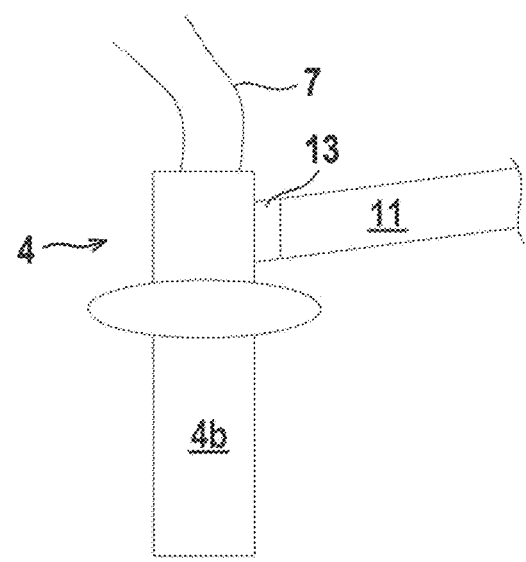
FIGS. 3-7: Different phases of connecting a dispense head to a container opening of a container for the dispensing system according to FIG. 1.
Figure 3:
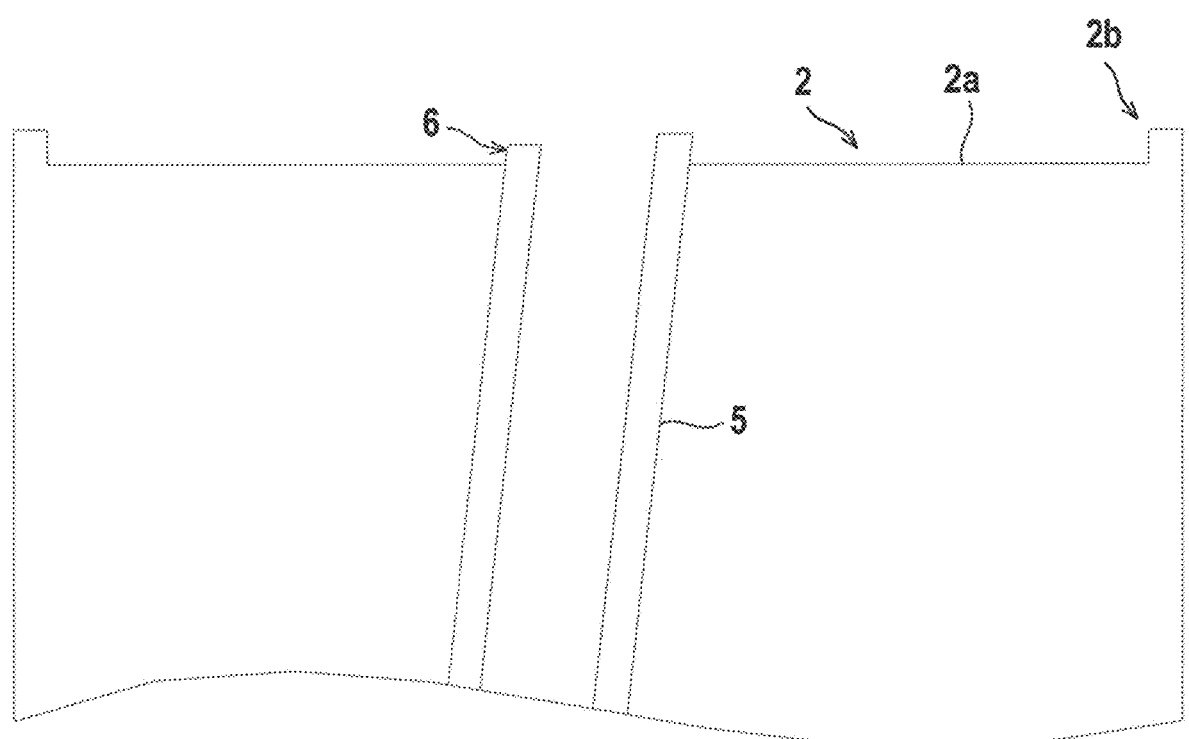

FIG. 3 shows a situation in which the dispense head 4 mounted on the robot arm 11 is still arranged at a large distance from the cover 2a of the container 2. The insertion move has not yet been activated, i.e. the axes of the robot arm 11 have not yet been released. Uncontrolled movements of the dispense head 4 caused by the tension exerted by the hose 7 are prevented thereby.

Figure 4:
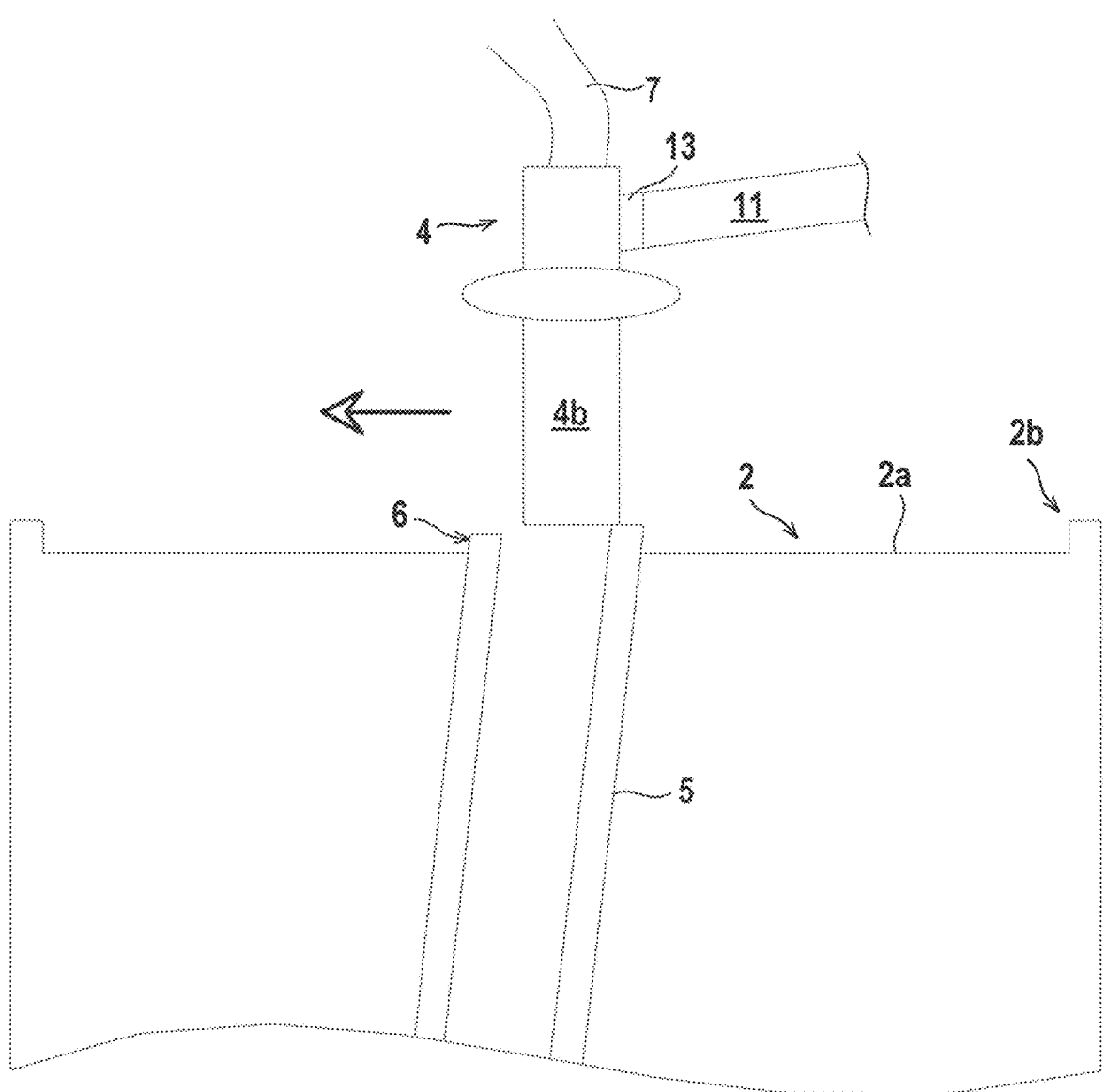

Starting from this position, the dispense head 4 is moved downward in the direction of the container opening 6. FIG. 4 shows the situation in which the lower end of the cylindrical connection segment of the dispense head 4 is seated on the edge 2b of the container opening 6. When the dispense head 4 approaches the container opening 6 or upon first contact of the dispense head 4 with the container opening 6 (as depicted in FIG. 4), the insertion move is started and the control unit 12 releases the axes of the robot arm 11 for carrying out compensation movements.

Since the edge 2b of the container opening 6 does not run in a horizontal plane due to manufacturing tolerances, the cylindrical connection segment is only seated locally on an edge region of the container opening 6, as FIG. 4 shows. This results in an asymmetric force distribution over the circumference of the cylindrical connection segment of the dispense head 4, which is detected with the force sensors 14. A compensation movement of the dispense head 4 (in the horizontal direction) is effected with the control unit 12 for minimizing the acting forces, as illustrated by the arrow in FIG. 4.

Figure 5:
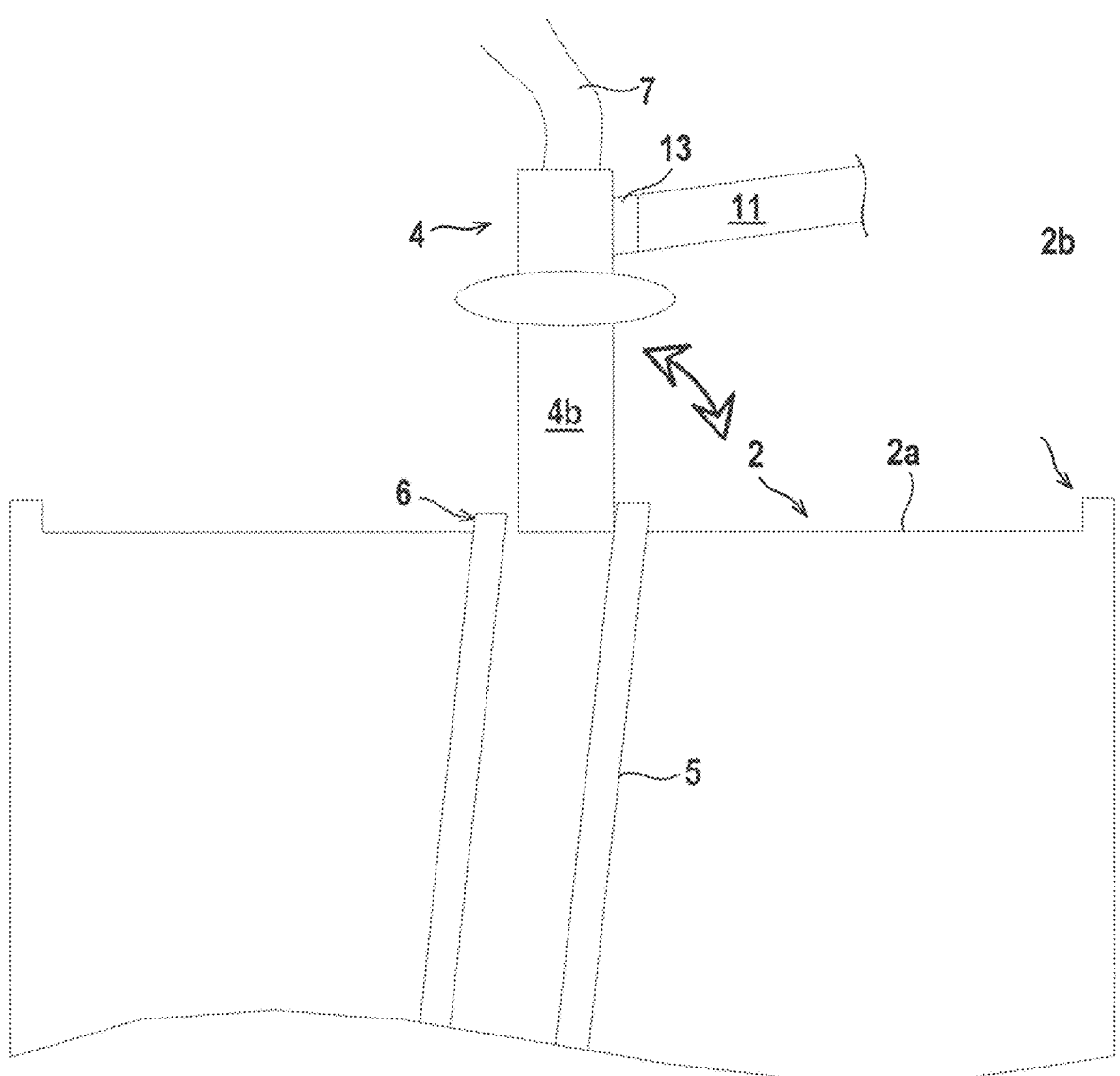

After this compensation movement, or if necessary, multiple such compensation movements, the cylindrical connection segment is inserted into the container opening 6 in dependence upon sensor signals of the force sensors 14, as FIG. 5 shows. The longitudinal axis of the dispense head 4 then runs exactly in the vertical direction. However, the longitudinal axis of the dip tube 5 the dip tube 5 does not run exactly in the vertical direction due to manufacturing tolerances.

Figure 6:
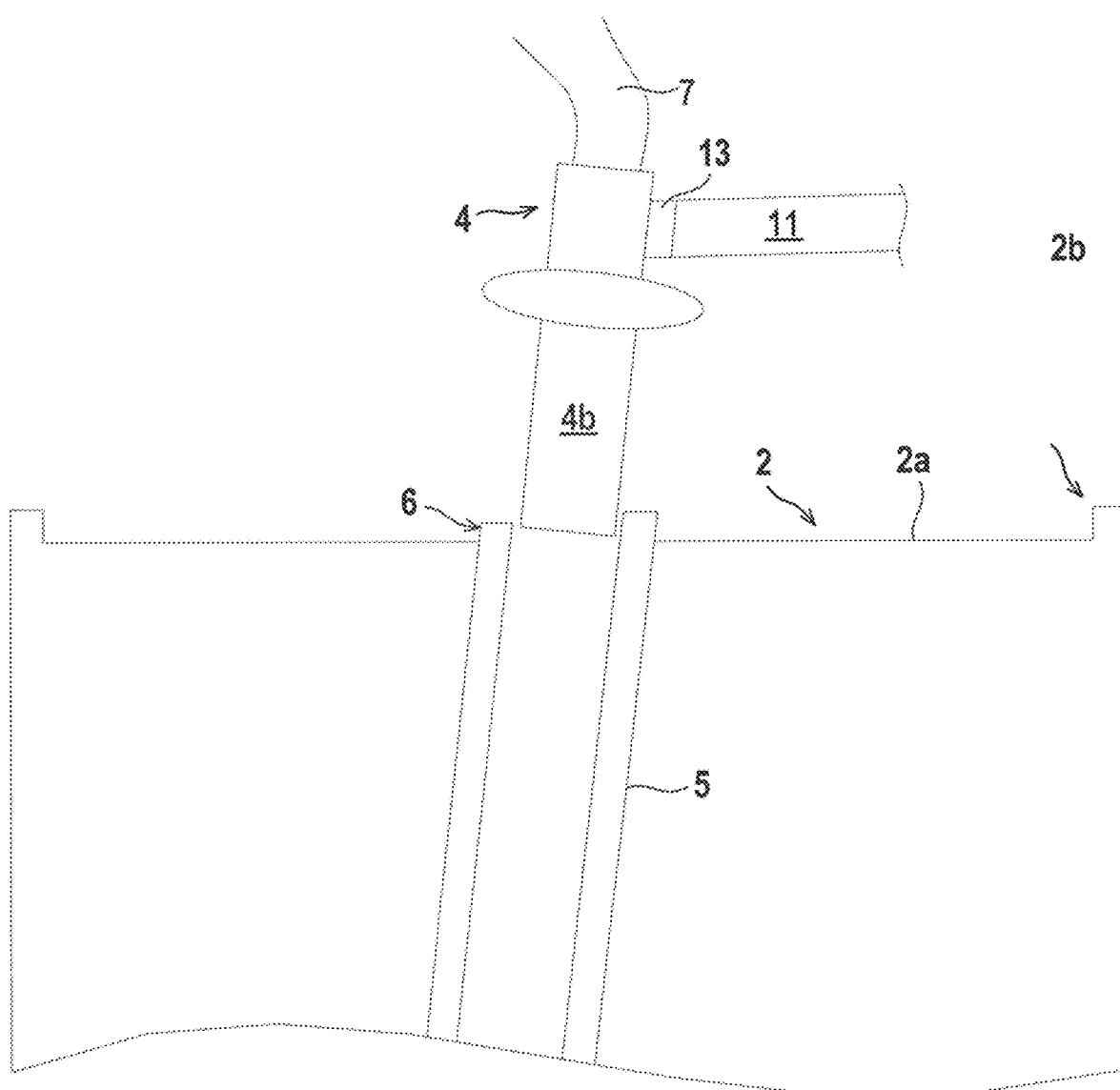
Figure 7:
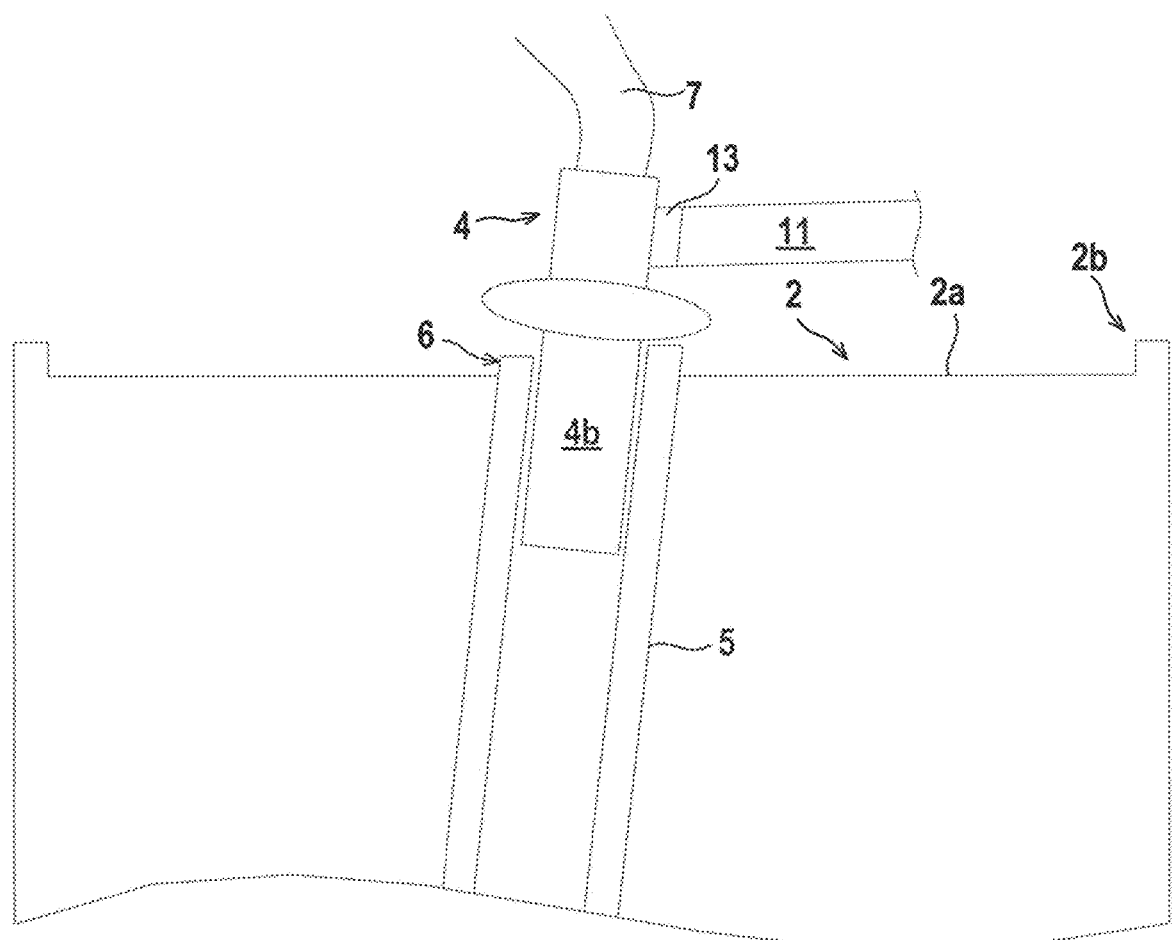

As a result, inserting the dispense head 4, which runs in the vertical direction, would result in a jamming of the dispense head 4 within the dip tube 5. This is prevented since the asymmetric acting of force on the dispense head 4 that occurs when the dispense head 4 is inserted into the dip tube 5 is detected with the force sensors 14. In dependence thereupon, the control unit 12 generates a compensation movement of the robot arm 11 in the form of a tilting movement (indicated with a double arrow in FIG. 5). After this compensation movement or multiple such compensation movements, the inclination of the dispense head 4 is adapted to the inclination of the dip tube 5, as FIG. 6 shows. In a translation movement the dispense head 4 can be inserted completely with the cylindrical connection segment into the dip tube 5, as FIG. 7 shows. The dispense head 4 is then in its target position at the container opening 6 and can be fixed there, such as with its screw connection. The fixing is also carried out by the robot 10. The dispense head 4 is thus connected to the dip tube 5 and by means of the dispense head 4, liquid 3 can be removed from the container 2 or supplied to it.

LIST OF REFERENCE NUMERALS (1) dispensing system
(2) container
(2a) cover
(2b) edge
(3) liquid
(4) dispense head—could also include a measurement head
(4a) liquid connection
(4b) cylindrical connection segment
(5) dip tube
(6) container opening
(7) hose
(8) pump
(9) RFID chip
(10) robot

(11) robot arm
(12) control unit
(13) connection flange
(14) force sensors

The invention claimed is:

1. A method for operating a dispensing system (1) with at least one container (2) having a container opening (6) and a dispense head (4) mounted on a robot arm (11) of a robot (10), wherein the dispense head (4) is automatically connected to the container opening (6) of the container (2) by means of the robot (10), such that liquid (3) can be removed from the container (2) or liquid (3) can be supplied to the container (2), characterized in that forces acting on the dispense head (4) when the dispense head (4) is inserted into the container opening (6) are detected by means of an arrangement of force sensors (14), and in that the robot arm (11) carries out compensation movements dependent upon the detected forces, whereby the dispense head (4) is aligned to the container opening (6), wherein axes of the robot arm (11) are released for carrying out compensation movements, and wherein a measurement head is connected to a connection flange (13) of the robot arm (11), said measurement head reading out a code from an RFID chip (9), thereby uniquely identifying the container (2).

2. The method according to claim 1, characterized in that acting forces are minimized by the compensation movements.

3. The method according to claim 1, characterized in that acting forces are compared to target values.

4. The method according to claim 1, characterized in that forces are detected in a position-resolved manner with the arrangement of force sensors (14).

5. The method according to claim 4, characterized in that forces are detected in an angle-resolved manner in the circumferential direction of the dispense head (4).

6. The method according to claim 1, characterized in that the axes of the robot arm (11) are released only during an insertion move in which the dispense head (4) is guided towards the container opening (6).

7. The method according to claim 1, characterized in that different compensation movements are carried out in dependence upon the relative position between dispense head (4) and container opening (6).

8. The method according to claim 7, characterized in that when the dispense head (4) is guided towards an edge (2b) delimiting the container opening (6), a compensation movement is carried out transverse to the longitudinal axis of the dispense head (4) dependent upon the forces then detected.

9. The method according to claim 1, characterized in that a dip tube (5) arranged in the container (2) opens out in the container opening (6), wherein forces acting on the dispense head (4) are detected with the force sensors (14) when the dispense head (4) is guided towards the dip tube (5).

10. The method according to claim 9, characterized in that when the dispense head (4) is inserted into the dip tube (5) a tilting movement of the dispense head (4) is carried out in dependence upon on the forces detected.

11. A dispensing system (1) with at least one container (2) having a container opening (6) and a dispense head (4) mounted on a robot arm (11) of a robot (10), wherein the dispense head (4) is automatically connected to the container opening (6) of the container (2) by means of the robot (10), so that liquid (3) can be removed from the container (2) or liquid (3) can be supplied to the container (2), characterized in that forces acting on the dispense head (4) when the dispense head (4) is inserted into the container opening (6) are detected by means of an arrangement of force sensors (14) and in that the robot arm (11) carries out compensation movements dependent upon the detected forces, whereby the dispense head (4) is aligned to the container opening (6), and wherein a measurement head is connected to a connection flange (13) of the robot arm (11), said measurement head reading out a code from an RFID chip (9), thereby uniquely identifying the container (2).

12. The dispensing system (1) according to claim 11, characterized in that the arrangement of force sensors (14) is arranged in the robot arm (11).

13. The dispensing system according to claim 11, characterized in that the robot (10) has a control unit (12), to which sensor signals of the force sensor(s) (14) are fed.

14. The dispensing system (1) according to claim 13, characterized in that the compensation movements of the robot arms (11) are controlled by the control unit (12).

15. The dispensing system (1) according to claim 11, characterized in that the dispense head (4) has a cylindrical connection segment (4b) that can be inserted into a dip tube (5) of the container (2).

* * * * *